US 6,567,978 B1

(12) United States Patent
Jarrell

(10) Patent No.: US 6,567,978 B1
(45) Date of Patent: May 20, 2003

(54) TELEVISION AUDIENCE MONITORING SYSTEM AND METHOD EMPLOYING DISPLAY OF CABLE CONVERTER BOX

(75) Inventor: Lester L. Jarrell, Lakeside, CA (US)

(73) Assignee: ADcom Information Services, Inc., Deerfield Beach, FL (US)

(*) Notice: Subject to any disclaimer, the term of this patent is extended or adjusted under 35 U.S.C. 154(b) by 0 days.

(21) Appl. No.: 09/169,065

(22) Filed: Oct. 9, 1998

(51) Int. Cl.[7] .......................... H04N 7/16; H04N 5/445; H04N 5/50; G09G 3/04; H04B 1/18
(52) U.S. Cl. .......................... 725/14; 725/18; 348/731; 348/563; 345/34; 455/154.1; 455/154.2
(58) Field of Search .................. 725/14–20; 345/51–52, 345/33–34, 43–46; 455/2.01, 154.1, 154.2, 155.1, 157.1, 157.2; 348/731, 563–564, 569–570

(56) References Cited

U.S. PATENT DOCUMENTS

| | | | | |
|---|---|---|---|---|
| 4,325,062 A | * | 4/1982 | Devlin ........................ 340/717 |
| 4,510,491 A | * | 4/1985 | Prato ........................... 340/792 |
| 4,599,644 A | | 7/1986 | Fischer ......................... 358/84 |
| 4,605,958 A | | 8/1986 | Machnik et al. .............. 358/84 |
| 4,613,904 A | | 9/1986 | Lurie ........................... 358/142 |
| 4,642,685 A | * | 2/1987 | Roberts et al. ............... 358/84 |
| 4,692,760 A | * | 9/1987 | Unno et al. .................. 340/756 |
| 4,764,808 A | | 8/1988 | Solar ............................ 358/84 |
| 4,847,685 A | | 7/1989 | Gall et al. .................... 358/84 |
| 4,907,079 A | | 3/1990 | Turner et al. ................. 358/84 |
| 4,912,552 A | | 3/1990 | Allison, III et al. .......... 358/84 |
| 4,972,503 A | * | 11/1990 | Zurlinden ...................... 455/2 |
| 5,294,981 A | | 3/1994 | Yazolino et al. ............... 348/4 |
| 5,305,464 A | * | 4/1994 | Frett ............................ 455/2 |
| 5,329,370 A | | 7/1994 | Yazolino et al. ............. 548/734 |
| 5,374,951 A | * | 12/1994 | Welsh ........................... 348/4 |
| 5,382,970 A | | 1/1995 | Kiefl ............................ 348/1 |
| 5,450,122 A | * | 9/1995 | Keene ........................... 348/1 |
| 5,465,113 A | * | 11/1995 | Gilboy ......................... 348/5.5 |
| 5,495,282 A | | 2/1996 | Mostafa et al. ................ 348/5 |
| 5,504,519 A | * | 4/1996 | Remillard ...................... 348/7 |
| 5,574,495 A | * | 11/1996 | Caporizzo .................... 348/13 |
| 5,689,799 A | | 11/1997 | Dougherty et al. ............ 455/2 |
| 5,780,783 A | * | 7/1998 | Heider et al. ............... 177/137 |
| 5,872,588 A | * | 2/1999 | Aras ............................. 348/1 |
| 5,880,768 A | | 3/1999 | Lemmons et al. ............. 348/1 |
| 5,881,360 A | | 3/1999 | Fong ............................ 455/2 |
| 5,945,988 A | | 8/1999 | Williams et al. ............. 348/10 |
| 5,973,750 A | * | 10/1999 | Ogawa et al. ............... 348/570 |
| 6,085,066 A | * | 7/2000 | Fong ............................ 455/2 |
| 6,405,370 B1 | * | 6/2002 | Jarrell ......................... 725/14 |

FOREIGN PATENT DOCUMENTS

| | | |
|---|---|---|
| DE | 24 52 926 | 5/1976 |
| DE | 3401 762 A1 | 8/1985 |
| DE | 37 42 426 A1 | 6/1989 |
| EP | 0 064 847 A2 | 11/1982 |
| EP | 0 127 068 | 12/1984 |

(List continued on next page.)

*Primary Examiner*—Andrew Faile
*Assistant Examiner*—Son P. Huynh
(74) *Attorney, Agent, or Firm*—Woodcock Washburn LLP

(57) ABSTRACT

A display interface device and method for determining a currently tuned-to channel of a set-top converter box having an electronic display that indicates the currently tuned-to channel via seven-segment display elements in response to drive signals provided thereto by the set-top converter device. The display interface device includes an electrical connection to the electronic display and a controller. The controller receives the drive signals over the electrical connection and generates information representative of the currently tuned-to tuned channel for use by downstream components. The information representative of the tuned channel may be output as an ASCII value representative of the currently tuned-to channel. The display interface may be part of a viewership metering system when used in conjunction with a viewership collection meter to determine viewer habits.

20 Claims, 4 Drawing Sheets

FOREIGN PATENT DOCUMENTS

| | | |
|---|---|---|
| EP | 0 430 711 A2 A3 | 6/1991 |
| EP | 0 687 083 | 12/1995 |
| EP | 0 763 950 | 3/1997 |
| FR | 2 555 383 | 5/1985 |
| FR | 2 717 025 | 9/1995 |
| FR | 2 738 977 | 3/1997 |
| GB | 2206253 A | 12/1988 |
| WO | WO 91/11062 | 7/1991 |
| WO | WO 94/14284 | 6/1994 |
| WO | WO 97/45973 | 12/1997 |
| WO | WO98/31114 | 7/1998 |

* cited by examiner

TELEVISION AUDIENCE MONITORING SYSTEM AND METHOD EMPLOYING DISPLAY OF CABLE CONVERTER BOX

FIELD OF THE INVENTION

The present invention relates to a device for monitoring usage of audiovisual equipment. In particular, the present invention relates to a device for interfacing with set-top converter boxes to determine a channel being watched by a television viewer.

BACKGROUND OF THE INVENTION

Determining a number of viewers watching a particular television program is of great importance to television networks, stations, programmers and advertisers. Information regarding the number of viewers is used to determine market share and the ratings of particular programs. This information is additionally used to determine advertising rates, which in turn affects the revenue generated by the television networks and stations.

There are numerous systems known in the art that attempt to monitor the viewing habit of television watchers. Early attempts at monitoring were fairly simple and unsophisticated, and generally required viewers to maintain a diary of programs watched. As the viewers began and finished watching a particular channel or program, they entered a start and end time in to the diary. The viewers periodically mailed the diaries to a central collection location, which then processed the diaries. The disadvantages of such a system are many, including: failure to enter information into the diaries, inaccurate entries into the diaries, and delays in processing. Further, as the number of channels provided to households has increased dramatically, it has become increasingly difficult for viewers to accurately track their viewing habits.

Later attempts have become more sophisticated and efficient by automating portions of the data collection process and the determination of the channel currently being viewed. For example, U.S. Pat. No. 4,642,685, to Roberts et al., discloses a television monitoring system having a channel detection unit, a people monitoring unit, a transmission unit, and a receiving unit. The channel detection unit detects ultra or very high frequency radiation emitted from a television tuner to determine if the channel being tuned is one of the channels which have been preset into the detection unit. The detection is performed by a pickup probe that inductively couples the signal emitted from the local oscillator of the television receiver. The people monitor unit is a powered handset that includes buttons assigned to each of the individuals who will be viewing the television set. The viewer depresses his or her assigned button to indicate he or she has started to watch the television. The viewing data is stored and transmitted by the transmission unit over household wiring to the receiving unit. The receiving unit sends the collected information to a central computer via a telephone connection. While this system speeds the data transmission process to the central computer as compared to mailing diaries to a processing center, there are several disadvantages in this system. For example, those of skill in the art will recognize that the location of the pick-up probe will greatly affect the sensitivity and accuracy of the channel detection unit. Further, as each viewer must manually depress a button on the people monitor, it is subject to the same inaccuracies of the diary method noted above, i.e., the failure of viewers to record the television channels actually watched.

U.S. Pat. No. 4,907,079, to Tuner et al., describes networked conventional audio and visual equipment that communicate via telephone lines with a remote central computer. The viewer provides channel selection commands or other programming commands to a microprocessor through an infrared remote control. A VCR tuner and TV tuner within the system provide audio and video signals for the conventional television monitor or television receiver. An AM and FM radio tuner may also be included, tunable by the microprocessor. In the Tuner et al. system, the video and/or audio signals from each tuner, video tape player, and disc players are coupled to the input side of an audio switch and a video switch. The switches are microprocessor controlled so that the audio and video program from any source may be coupled to any output or display device at the viewing location. The system includes a motion detector to determine the presence of viewers and provides for communication with a remote computer to monitor use of each networked audiovisual unit. While this system provides for monitoring and logging of each networked audiovisual unit, the Tuner et al. system is designed to control a large home-entertainment system, rather than a small-scale solution to monitoring viewers' habits. In particular, the Turner et al. system is indicated to cost a few hundred dollars, and would fail to provide a solution to television networks and advertisers who are interested in obtaining accurate viewing statistics by deploying systems to a relatively large number of viewers.

U.S. Pat. No. 4,912,552, to Allison, III, et al., describes a system that collects television channel tuning data that transmits the data to a central site in a transparent manner to the occupants of the household. The system is designed having a hub and spoke architecture, where the hub unit communicates with metering devices attached to television receivers and/or cable television converters. The meters are periodically polled by the hub, which then collects the data acquired by each meter. The hub communicates with a host computer via standard telephone lines. The Allison, III, et al. system particularly describes the central hub device and gathering data before transmitting it to the central site. However, the Allison, III et al. system fails to provide an improved metering unit by contemplating the use of known channel meters.

U.S. Pat. No. 5,374,951, to Welsh, discloses a system for monitoring and recording data related to television program viewing habits that includes a plurality of remote program monitor units that automatically report such data to a central computer via a conventional telephone network. The monitor unit reads a character string that is decoded from the demodulated television signal received by the unit. The character string is compared to a string table stored within the unit to determine the content being viewed by the television watcher. If there is a match, an event code and a time are stored in the unit for reporting to the central computer. However, for the system to operate, the character string must be encoded into the received television signal, otherwise there will be no match with the string table stored in memory. Further, the string table must be kept current for the system to provide accurate results.

U.S. Pat. No. 5,382,970, to Kiefl, describes a system for monitoring and collecting data on the viewing habits of television viewers that includes a portable personal data collection device that is separate from the television or set-top converter. The personal data collection devices includes a detector for providing a station identifier identifying the particular broadcast signal being received by the receiver, a clock for providing a signal representing time, a memory for storing data, and a cellular telephone module for communicating with a central location. The cellular telephone module periodically transmits stored data within the device to the central location. The viewer may enter channel information directly into the device, or the device may include a detector for detecting a channel selection signal from a television remote control to change the station identifier stored in memory. While this is an improvement over diaries, this system requires a personal data collection device for each individual watching a particular television set. Further, because the device is physically separate from the television set, the data collected may not be accurate as viewers may either fail to enter channel information or the device may not detect an infrared transmission from the television remote control.

U.S. Pat. No. 5,495,282, to Mostafa, et al., discloses a tuning/monitoring module for monitoring use of a video equipment without the use of probes by injecting RF signals into a cable converter and a VCR in order to detect channels selected by the cable converter and the VCR. In accordance with signals received from the cable converter and the VCR, the tuning/monitoring module can determine a selected channel being viewed by the viewers. Channel identification signals are also injected into the VCR and cable converter for recording by the VCR on videotape. The state of the "TV/VCR" switch of the VCR is determined by injecting a code signal into the VCR and determining whether that signal is present in an RF video signal output by the VCR. The receiver also receives data contained in channel identification signals. The receiver is selectively connectable to the VCR and the cable converter. However, this system requires the use of the special tuning/monitoring module in place of a tuner provided with a television or VCR in order to provided the injected signal to determine the viewed channel. Such a special tuning/monitoring module increases the expense associated with tracking viewers' habits.

In view of the above, there is a need for an integrated solution to detect the channels being watched by viewers. There is also a need for a system that does not interfere with any of the consumer's electronics, equipment or features. In particular, there is a need for a system that provides channel information without requiring addition steps to be taken by viewers, and that functions such that the consumer's VCR, TV, remote controls are not tampered with or opened and continue to operate normally.

SUMMARY OF THE INVENTION

In view of the above, the present invention, through one or more of its various aspects and/or embodiments is thus presented to accomplish one or more objects and advantages, such as those noted below.

According to an aspect of the present invention, there is provided a display interface device for use in determining a currently tuned-to channel of a set-top converter box having an electronic display, where the electronic display indicates the currently tuned-to channel in response to drive signals provided thereto by the set-top converter device. The display interface device comprises an electrical connection to the electronic display and a controller that is connected to the electronic display by the electrical connection. The controller receives the drive signals transmitted to the electronic display by the set-top converter device and interprets the drive signals to generate information representative of the currently tuned-to tuned channel.

According to a feature of the present invention, the electronic display comprises at least one seven-segment display element, and the seven-segment display element is adapted to display an alphanumeric character representation of the currently tuned-to channel of the set-top converter box. The drive signals are provided to plural seven-segment display elements in the electronic display using a multiplexing scheme in order to display each alphanumeric character of the currently tuned-to channel. Further, the drive signals may comprise scan signals provided over scan lines that selectively enable one seven-segment display element in the electronic display and segment signals provided over segment lines that drive each segment of the seven-segment display element. The scan lines and the segments lines are input to predetermined pins of an input/output port of the controller in order to determine the currently tuned-to channel.

According to another feature, the information representative of the tuned channel may be output to a second device connected to the display interface via a second electrical connection. The second device may stores receive and further process the information representative of the currently tuned-to channel. In addition, the display interface board may be adapted to receive power and additional data via the second electrical connection.

According to yet another feature, the second device may comprise a viewership collection meter and the information representative of the tuned channel may be coded as an ASCII value representative of the currently tuned-to channel and output to a viewership meter connected to the display interface via a second electrical connection. The viewership meter may also include an audio matching circuit that compares a first audio signal of a predetermined channel tuned by the viewership collection meter with a second audio signal output by a television to which the set-top converter is connected, wherein if the first audio signal and the second audio signal match, the viewership collection meter determines that the channel to which the set-top converter box is tuned is the predetermined channel.

According to another aspect of the present invention, there is provided a system for determining viewership of channels tunable by a set-top converter box having an electronic display. The system comprises a display interface device connected to the electronic display, and a viewership collection meter connected to the display interface that periodically stores a channel to which the set-top converter is tuned. The channel to which the set-top converter is tuned is determined by the display interface and communicated to the viewership collection meter, and the viewership collection meter stores the channel and forwards it to a predetermined location at selected times.

According to yet another aspect of the present invention, there is provided a method of determining a channel to which a set-top converter box is tuned using a display interface where the set-top converter comprises an electronic display that is driven by drive signals. The method comprises receiving drive signals at the display interface; determining a channel to which the set-top converter box is tuned by sampling the drive signals; generating a coded representation of the determined channel; and outputting the coded representation.

According to a feature of the method, the electronic display comprises at least one seven-segment display element, and the drive signals comprise scan signals provided over scan lines that enable each seven-segment display element and segment signals provided over segment lines that drive each segment of the seven-segment display element. The step of determining a channel to which the set-top converter box is tuned further comprises (a) determining if a scan line for the seven-segment display element is active; (b) if the scan line is active at step (a), then determining which of the segment lines are active to determine character being displayed by the seven-segment display element; and (c) repeating steps (a) and (b) for each seven-segment display element in the electronic display.

According to another feature of the method the step of generating a coded representation of the determined channel comprises generating an ASCII value of the channel to which the set-top converter box is tuned. Outputting the coded representation may comprise serially transmitting the ASCII value to a viewership meter. The ASCII value may be stored at the viewership meter and forwarded at predetermined times to a central collection site.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

The present invention provides a method and apparatus for detecting the currently tuned-to channel of a subscriber's set-top converter box having an electronic display that indicates the channel and status. The information related to the detected channel may then be forwarded to a data collection system within the subscriber's home or other location for eventual transmission to a central data collection and compilation site. Such information, taken from a large sample size, may be used to measure network viewing and the interactive environment.

In order to obtain accurate viewership data, it is preferable to gather data from a large sample of subscriber homes within a cable satellite system's broadcast base. The sample is typically derived from demographic and lifestyle characteristics, shopping patterns, and consumer profile of the subscribers' homes. Ideally, the sample of homes from the entire system should represent the system as a whole. To collect data, each of the homes to be sampled may be supplied with a viewership meter (described below). The viewership meter is preferably supplied by ADcom Information Services, Inc., Carlsbad, Calif., and is installed on each television in the sampled homes. Such a meter is quickly and easily installed as compared to other known meters and provides a complete record of viewing in each participating household. When the quantitative ratings from the viewership meters are compiled, the information may be used by advertisers and network programmers to accurately target audiences and determine ideal spot placement for advertisements.

Figure 1:
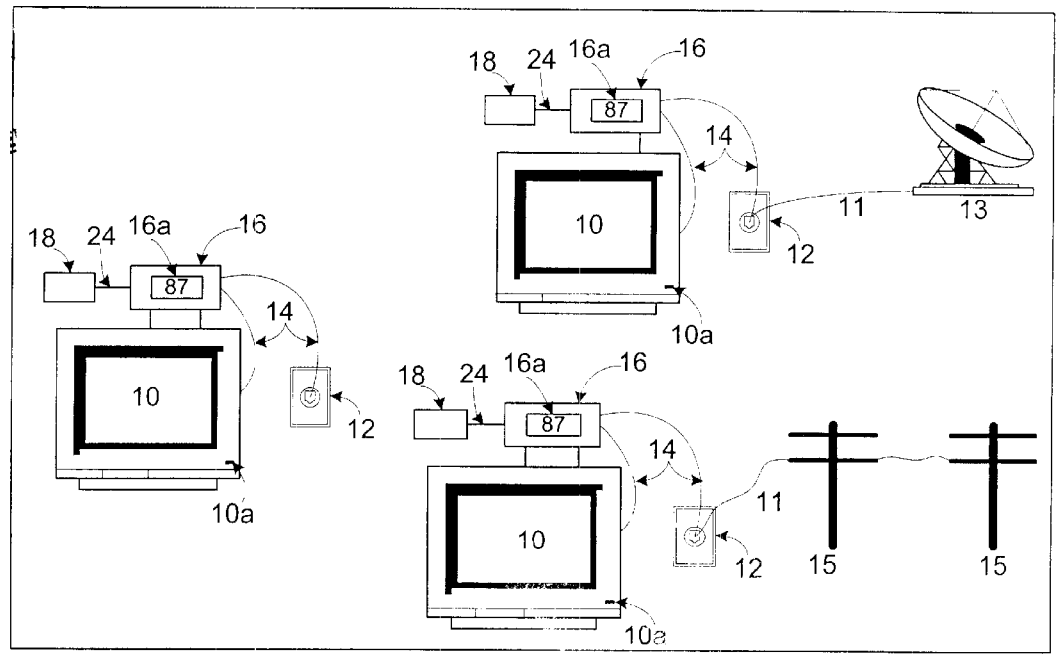
FIG. 1 is an overview of the environment in which the television audience monitoring system of the present invention may be implemented.

Referring to FIG. 1, there is illustrated an overview of an exemplary environment within which the present invention may be embodied. As illustrated, signals from a satellite/cable system provider are received via transmission lines 11 connected to one of a satellite dish 13 or power poles 15. The satellite dish 13 may receive signals from a plurality of earth orbiting satellites (not shown), whereas the transmission lines 11 strung over power poles 15 (or buried underground) may be connected to a transmission site (not shown). The transmission lines 11 enter the viewer's home or other location and are typically connected to a wall plate 12 having a 75Ω co-axial connector.

To provide a signal to a viewer's television set 10, a first 75Ω co-axial cable 14 electrically connects the transmission line 11, at the wall plate 12, to a first connection on, e.g., the rear panel of a set-top converter box 16. A second 75Ω co-axial cable 14 connects between a second connection on the rear panel of the set-top converter 16 and to, e.g., a 75Ω connector in a television set 10. The set-top converter box 16 is used to selectively tune channels in accordance with a viewer selection. Alternatively, a single 75Ω co-axial cable 14 may be used to provide signals directly to the television set 10. Also as shown, the television set includes an audio-out jack 10a.

The set-top converter 16 is connected to a viewership collection meter 18 by wires or a cable 24. Alternatively, an electrical connector or the like may be used in place of wires or cabling 24 to connect the viewership meter 18 and the set-top converter 16. The viewership meter 18 is designed such that it may connect to any television 10 or set-top converter 16. In accordance with an aspect of the present invention, the collection meter 18 determines a viewed channel by receiving channel-related information from a display interface board 22 (described below with regard to FIGS. 2 and 3). The collection meter 18 may also use an audio matching technique to log channel viewership throughout the day. The collection meter 18 is preferably capable of recording the channel location (i.e., the tuned channel) every five seconds, storing the information and forwarding it to a central computer (not shown). The data is forwarded by telephone or other means during time periods when the transmission to the central site is unlikely to interfere with the occupants' use of the transmission media. The central computer collects the data from all viewership meters 18, analyzes the information, combines the records with additional qualitative data, and sends prepared reports to the system operator as early as the next day. Preferably, hundreds, or even thousands of viewership meters 18 may be managed from one central system. Data and reports are received by the system operators via e.g., the Internet and Frame Relay routers. System personnel can quickly generate custom reports that show channel ratings by day, target and network ranking.

Figure 2:
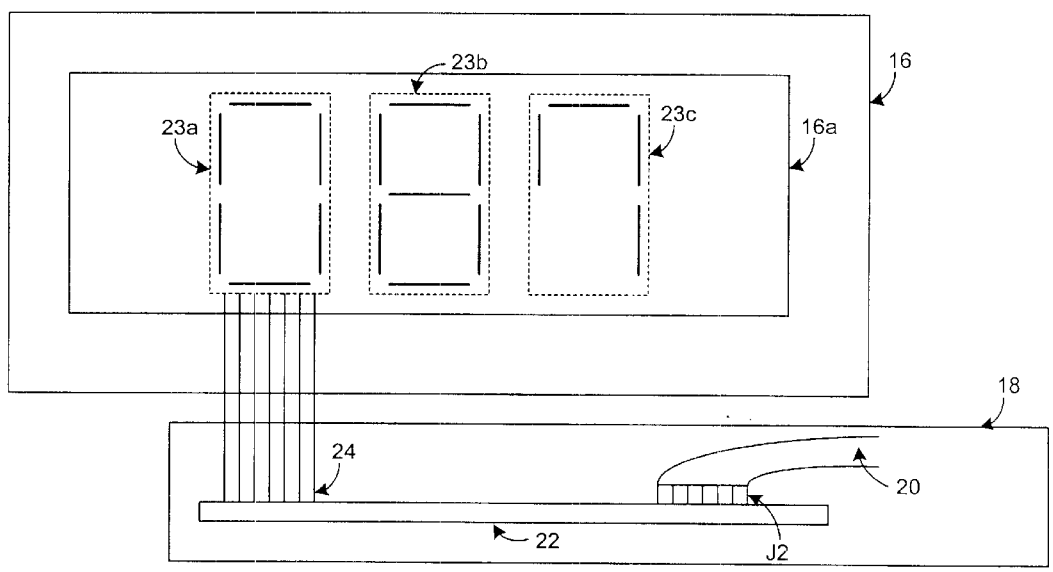
FIG. 2 is a block diagram illustrating the interconnection of a television signal converter box and display interface circuit.
Figure 3:
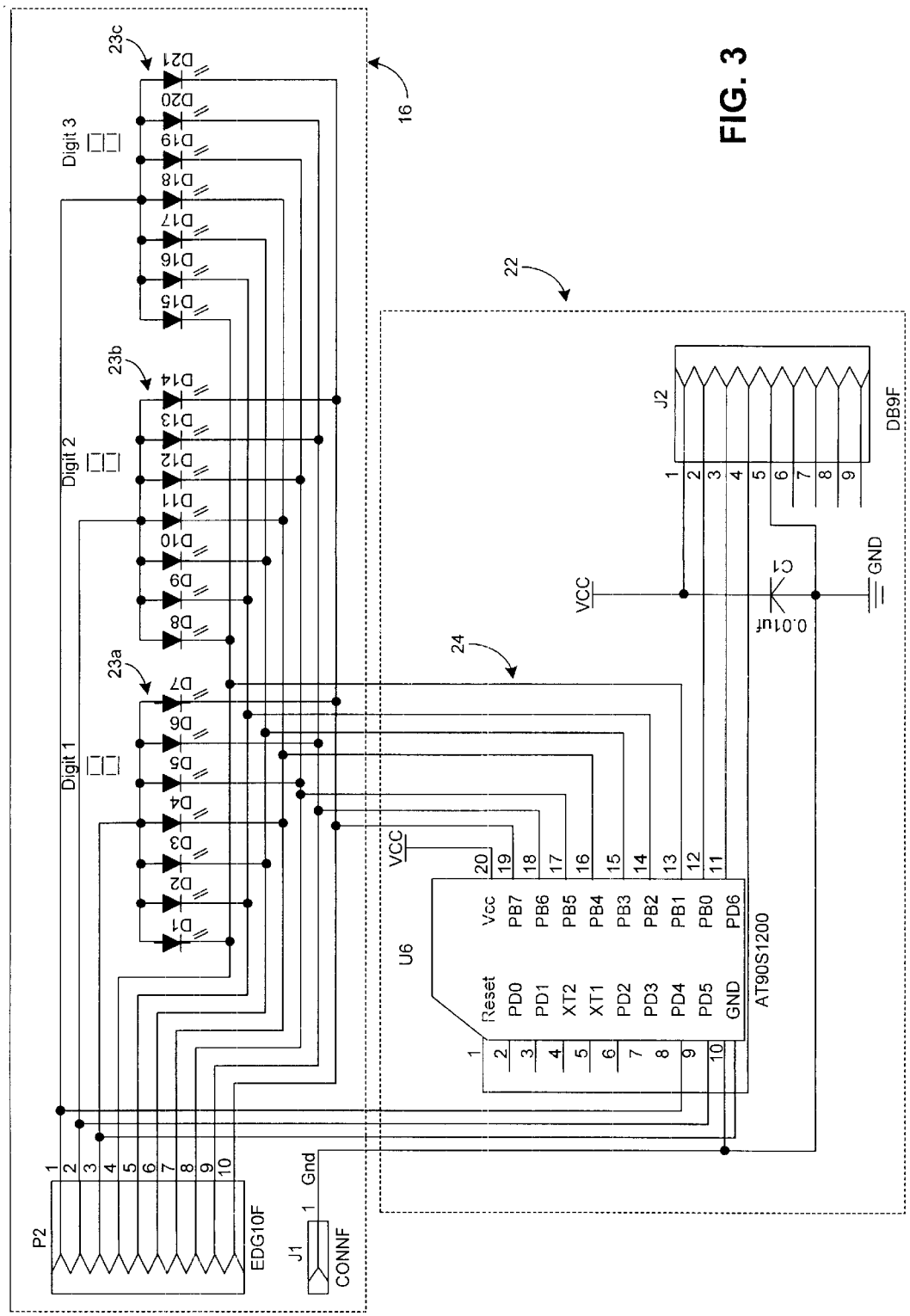
FIG. 3 is a schematic diagram illustrating a plurality of light emitting diodes display of the television signal converter box and the display interface circuit.

Referring now to FIGS. 2 and 3, there is illustrated a display interface board 22 of the present invention. The display interface board 22 is preferably provided within the collection meter 18 and includes a microcontroller U6, a connector J2, and a capacitor C1, which is charged from a voltage source Vcc. The microcontroller U6 is preferably an 8-bit microcontroller having a Reduced Instruction Set Computer (RISC) architecture and includes dedicated digital input lines, digital output lines and an on-board programmable memory. The microcontroller U6 receives channel data from the set-top converter box 16, stores the data in an internal random access memory (RAM) or other memory, and converts the data into an ASCII channel value that is serially transmitted to the components within collection meter 18 over line 20. Other data formats compatible with the collection meter 18 may be used. The microcontroller U6 may also provide capabilities such as a real-time clock, a modem chip-set. Preferably, the microcontroller U6 comprises a AT90S1200, manufactured by Atmel Corporation, San Jose, Calif. Other similar microcontrollers may be used, as the present invention is not limited to the above-noted microcontroller.

As illustrated the interface board 22 is connected by wires 24 or other means to each of one or more seven-segment light emitting diode (LED) display elements 23a–c of the set-top converter box 16. It is preferable that the LED display elements 23 are driven in a multiplexed fashion and have a common cathode or common anode design. It is noted that segments in LED displays 23 having the multiplexed driving scheme are scanned and driven one at a time at a scan rate of a few hundred Hertz. Further, although three LED displays 23a–c are illustrated in the Figures, it is within the scope of the present invention to include fewer or more LED displays 23 or other displays capable of displaying alphanumeric information. One end of the wires 24 is connect to respective leads from jumper P2, which supplies drive signals to the LEDs of the display elements 23. The other end of the wires 24 are connected to appropriate port pins of the input/output (I/O) ports of the microcontroller U6. At predetermined times, the port pins are sampled, and based on the voltages present at the pins, the microcontroller U6 determines and outputs the ASCII representation of the channel value over the I/O port, which is connected to connector J2. Additionally, other data and power may be transferred between the display interface board 22 and external devices over connector J2. It is noted that additional or fewer connectors may be provided on the display interface 22. For example, a single connector may be provided to provide all of the above-noted features at a reduced cost.

Figure 4:
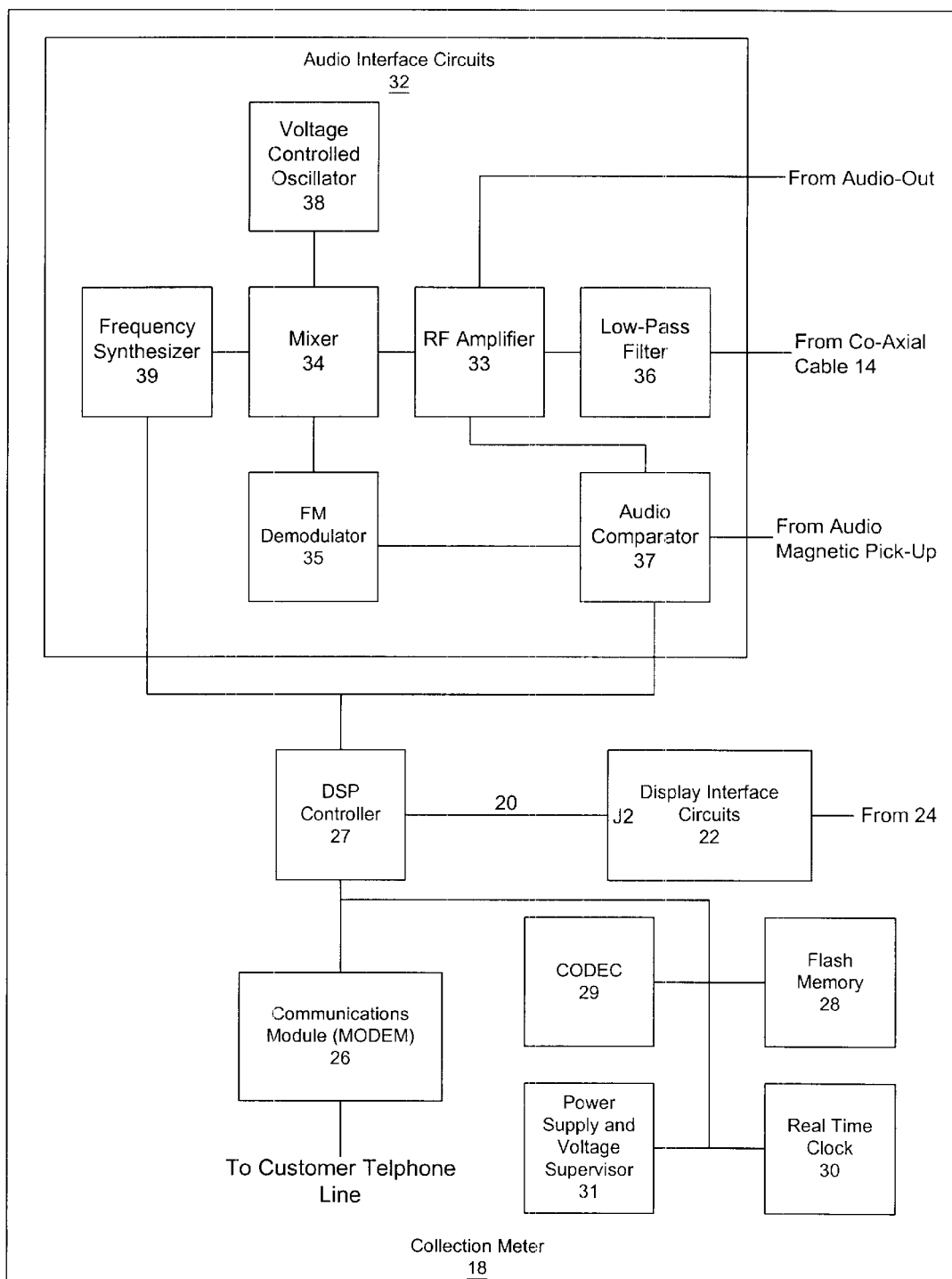
FIG. 4 is a block diagram of an exemplary collection meter in accordance with an aspect of the present invention.

FIG. 4 is a block diagram of the exemplary components within the collection meter 18. The collection meter 18 generates "snapshots" of selected channels on cable, satellite and standard air systems and compiles information related to the snapshots. The information may include the channel or channels viewed at a particular time or on a particular day. The compiled information may be used to generate viewership ratings and other research related services for multi-channel subscriber television systems (e.g., cable television and satellite television).

The collection meter 18 includes Audio interface circuits 32, a communications module 26, a digital signal processor (DSP) controller 27, a flash memory 28 to store parameters and programming information for the DSP controller 27, a CODEC 29 to provide for compression and decompression of data (e.g., audio or video information) in accordance with predetermined mathematical algorithms, a real time clock 30, and a power supply and voltage supervisor 31. The DSP controller 27 may be programmed to provide functionalities such as, tuning to cable channel frequencies, detection of the state of the television (e.g., powered ON or OFF), detection of the channel being viewed, communication to the communications module 26, management of storage of snapshot information (e.g., time stamp), reception and storage of information related to a telephone number of a central collection site and time for sending snapshot information to the central site, dial-up capability to contact the central site and to upload the snapshot information, and a capability to receive time and reset the onboard teal time clock during the upload. Additional features and functionalities may be provided as user requirements change by reprogramming the DSP controller 27. As illustrated, the DSP controller 27 receives information over line 20 from the display interface board 22 (from connection J2).

The dial-up capability is preferably programmed in firmware within the DSP controller 27 and is preferably not programmable by end-users (e.g., viewers). To performed the dial-up function, the communications module 27, which is connected to the customer's telephone line, is taken off-hook in accordance with the V.22 protocol at predetermined times and dual-tone multi-frequency (DTMF) signals are transmitted to call the central collection site. The telephone number of the central collection site is preferably coded into the firmware and may be changed by the central site during data communications. Using the V.22 protocol, the communications module 27 transmits signals representative of the data collected by the collection meter 18 to the central site. As illustrated in FIG. 4, the communications module 27 may comprise a MODEM.

The power supply 31 regulates the voltage to the communications module 27 and the Audio interface circuits 32. The power supply 31 receives, for example, 12VAC and may provide, ±5V and ±12V DC to the modules 27 and 32. The voltage supervisor portion monitors the ±5V and ±12V and resets the DSP controller 26 and the flash memory 28 if the supplied voltage drops below these values. The total power consumption is preferably less than 5 Watts.

The Audio interface circuits 32 include an RF amplifier 33, a mixer 34, an FM demodulator 35, a low-pass filter 36, audio comparator 37, voltage controlled oscillator (VCO) 38, and a frequency synthesizer 39. The broad-band cable signal to the television set enters through a coaxial cable 14 coupled to the Audio interface circuits 32. The audio sub-carrier of a particular cable channel is coupled to the low pass filter 36 and the RF amplifier 33 by a low-loss coupler. The signal is converted to a predetermined frequency (e.g., 3.25 MHz) by the mixer 34, the local oscillator 38 and the frequency synthesizer 39, which is controlled by the DSP controller 27. The predetermined frequency is demodulated by the FM demodulator 35 so the audio program for a tuned channel may be recovered. The audio signal from the television set 10 is obtained from an audio pick-up device (not shown) or from the audio jack 10a in the television set 10. The audio pick-up device is coupled to the television set 10 to detect the audio signal broadcast. The audio signal is fed to the RF amplifier 33 and then into an audio comparator 37. The recovered audio from the FM demodulator 35 is also fed into the audio comparator 37 and compared with the television audio signal. If the audio frequencies match, then a logic high signal is sent by the audio comparator 37 to the DSP controller 27. If there is not a match between the recovered audio from the FM demodulator 35 and the television audio, then the DSP controller 27 tunes the frequency synthesizer 39 to the next channel and continues until a match is found. The collection meter 18 may be enclosed in an assembly (not shown) that includes internal-metalized plastic covers. The Audio interface circuits 32 may be mounted on the bottom cover and the communication module 27 mounted up-side-down on the top of the Audio interface circuits 32. The display interface circuits 22 may be mounted on the top cover. The assembly may include the following interfaces: a 75Ω cable in (54 MHz to 1 GHz, −16 dBmV to +10 dBmV), a power adapter in (12 VAC, <420 mA), audio in (1V$_{p-p}$, 100 Hz to 5 kHz, >1 kΩ impedance), a magnetic sensor in (5 mV$_{p-p}$, 100 Hz to 5 kHz, 1 kΩ impedance), a POTS In/Out (RJ-11, meets FCC Part 68 requirements), and a power/mode indicator (green LED).

The various components and specifications noted-above with regard to the collection meter 18 have been provided herein for exemplary purposes only. Other components and different specifications are intended to be within the scope of the present invention. For example, the collection meter 18 may include a microprocessor or microcontroller and associated circuitry to perform the various functions of the DSP controller 27. Further, additional or fewer communications interfaces may be provided (e.g., power line data communication, RF data communication, or digital telephony).

Figure 5:
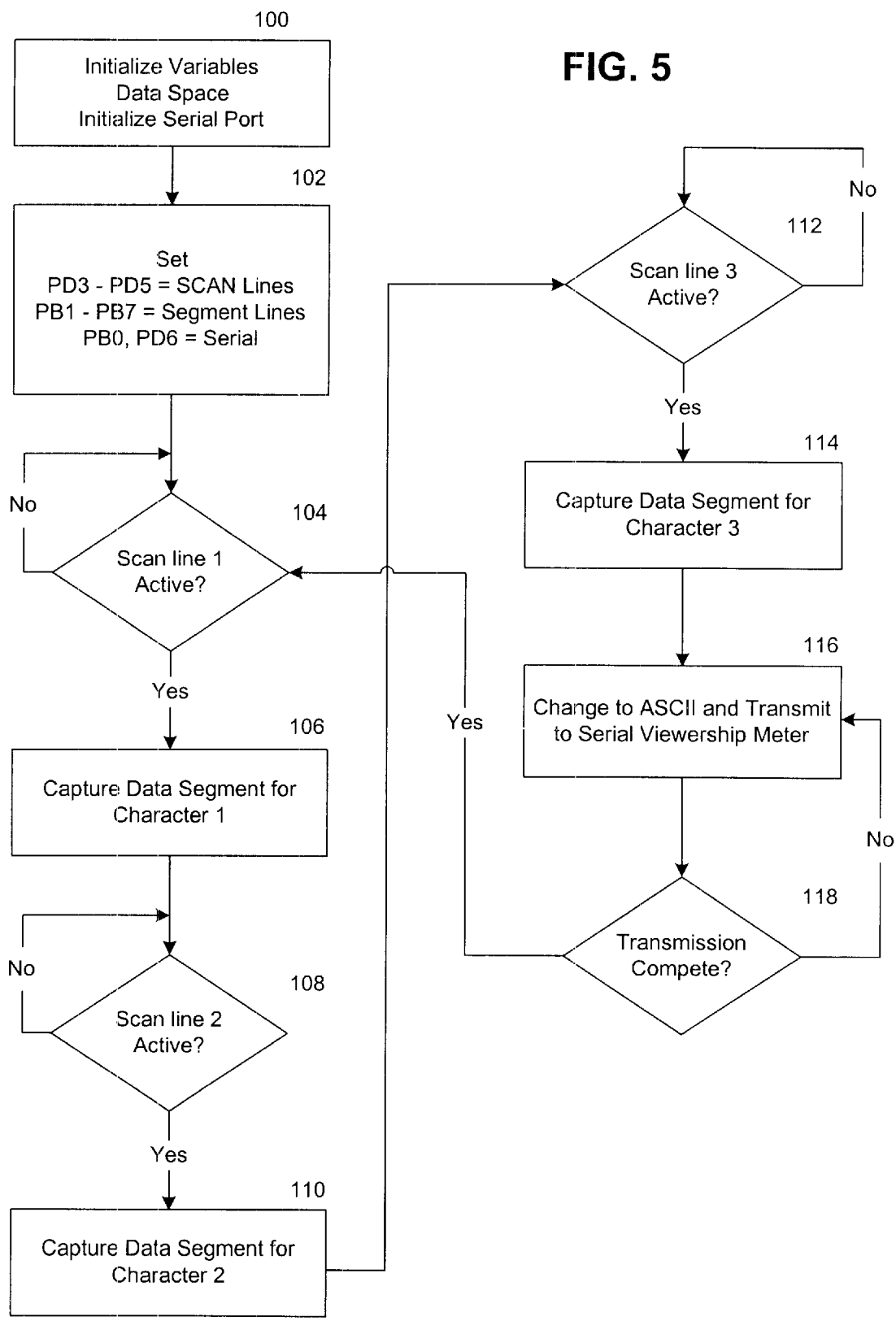
FIG. 5 is an exemplary flow chart illustrating the steps and processes performed by a microcontroller included with the display interface circuit.

FIG. 5 is a exemplary flowchart of the sequence of operations performed by the microcontroller U6 in accordance with an aspect of the invention. At step 100 the variables, data space and serial ports are initialized. At step 102, the microcontroller I/O ports are initialized and set. In the Atmel AT90S1200, two I/O ports are provided (Port B and Port D) having 8 and 7-bit widths. As noted in step 102 and illustrated in FIG. 3, bits 3–5 of Port D are set to receive the SCAN lines of the LED display 23 and bits 1–7 of Port B are set to receive the segment lines of the LED display 23. Bit 0 of Port B and bit 6 of Port D are set to output serial data to connector J2. Steps 100 and 102 are typically executed at power-up or during a reset operation.

At step 104 it is determined if scan line 1 (PD3) is active. If not the process loops back to step 104 to later determine if scan line 1 is active. If scan line 1 is active, then at step 106, the data segment for character 1 (i.e., the first LED display 23*a*) is captured and stored in memory in the microcontroller U6.

At step 108 it is determined if scan line 2 (PD4) is active. If not the process loops back to step 108 to later determine if scan line 2 is active. If scan line 2 is active, then at step 110, the data segment for character 2 (i.e., the second LED display 23*b*) is captured and stored in memory in the microcontroller U6.

At step 112 it is determined if scan line 3 (PD5) is active. If not the process loops back to step 112 to later determine if scan line 3 is active. If scan line 3 is active, then at step 114, the data segment for character 3 (i.e., the third LED display 23*c*) is captured and stored in memory in the microcontroller U6.

At step 116 the channel information captured at steps 106, 110 and 114 is converted into ASCII and serially transmitted to the collection meter 18 at a predetermined data rate. After the transmission is complete at step 118, the process returns to step 104.

As described above, the present invention provides for a novel apparatus and method for capturing information related to the channel to which a set-top converter box is tuned and for converting the information into data having a format compatible with a viewership data collection meter.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

For example, the set-top converter box 16 may be modified to include the components of the collection meter 18, such that a single set-top device performs the functions of both devices.

What is claimed is:

1. A display interface device for use in determining a currently tuned-to channel of a set-top converter box having an electronic display, said electronic display indicating said currently tuned-to channel in response to drive signals provided thereto by said set-top converter device, said display interface device comprising:

an electrical connection to said electronic display, said electrical connection being adapted to communicate said drive signals;

a controller, said controller being connected to said electronic display by said electrical connection and receiving said drive signals transmitted to said electronic display, wherein said controller receives and interprets said drive signals to generate information representative of said currently tuned-to tuned channel.

2. The display interface as recited in claim 1, wherein said electronic display comprises at least one display element, and wherein said display element is adapted to display an alphanumeric character representation of said currently tuned-to channel of said set-top converter box.

3. The display as recited in claim 2, wherein said drive signals are provided to plural display elements in said electronic display using a multiplexing scheme in order to display each alphanumeric character of said currently tuned-to channel, and wherein said drive signals are input to said controller and sampled to determine said currently tuned-to channel.

4. The display interface as recited in claim 3, wherein said drive signals comprise scan signals provided over scan lines that selectively enable one display element in said electronic display and segment signals provided over segment lines that drive each segment of said display element, wherein said scan lines and said segments lines are input to predetermined pins of an input/output port of said controller in order to determine said currently tuned-to channel.

5. The display interface as recited in claim 4, wherein said information representative of said tuned channel comprises an ASCII value representative of said currently tuned-to channel, and wherein said controller outputs said ASCII value to a collection meter connected to said display interface via a second electrical connection.

6. The display interface as recited in claim 5, wherein said collection meter comprises an audio matching circuit, said audio matching circuit comparing a first audio signal of a predetermined channel tuned by said collection meter with a second audio signal output by a television to which said set-top converter is connected, wherein if said first audio signal and said second audio signal match, said collection meter determines that said channel which said set-top converter box is displaying is said predetermined channel.

7. The display interface as recited in claim 1, wherein said information representative of said tuned channel is output to a second device connected to said display interface via a second electrical connection, and wherein said second device receives and further processes said information representative of said currently tuned-to channel.

8. The display interface as recited in claim 7, wherein said second device comprises a collection meter, and wherein said collection meter stores said information representative of said currently tuned-to channel and forwards it to a predetermined location at selected times.

9. The display interface as recited in claim 8, wherein information representative of said tuned channel comprises an ASCII value representative of said currently tuned-to channel, and wherein said controller outputs said ASCII value to said collection meter via said second electrical connection.

10. The display interface as recited in claim 7, wherein said display interface board is adapted to receive power and additional data via said second electrical connection.

11. A system for determining viewership of channels tunable by a set-top converter box having an electronic display, said system comprising:
  a display interface device connected to said electronic display; and
  a collection meter connected to said display interface, said collection meter periodically storing a channel to which said set-top converter is tuned,
  wherein said channel to which said set-top converter is tuned is determined by said display interface by receiving and interpreting drive signals transmitted to said electronic display of said set-top converter and communicated to said collection meter, and wherein said collection meter stores said channel and forwards it to a predetermined location at selected times.

12. The system for determining viewership of channels tunable by a set-top converter box as recited in claim 11, wherein said collection meter further comprises an audio matching circuit, said audio matching circuit comparing a first audio signal of a predetermined channel tuned by said collection meter with a second audio signal output by a television to which said set-top converter is connected, wherein if said first audio signal and said second audio signal match, said collection meter determines that said channel which said set-top converter box is displaying is said predetermined channel.

13. The display interface as recited in claim 11, wherein said electronic display comprises at least one display element, and wherein said display element is adapted to display an alphanumeric character representation of said currently tuned-to channel of said set-top converter box.

14. The display interface as recited in claim 13, said display interface comprising a controller, wherein said drive signals are provided to plural display elements in said electronic display using a multiplexing scheme in order to display each alphanumeric character of said currently tuned-to channel, and wherein said drive signals are input to said controller and sampled to determine said currently tuned-to channel.

15. The display interface as recited in claim 14, wherein said drive signals comprise scan signals provided over scan lines that selectively enable one display element in said electronic display and segment signals provided over segment lines that drive each segment of said display element, wherein said scan lines and said segments lines are input to predetermined pins of an input/output port of said controller in order to determine said currently tuned-to channel.

16. A method of determining a channel to which a set-top converter box is tuned using a display interface, said set-top converter comprising an electronic display that is driven by drive signals, said method comprising:
  receiving drive signals at said display interface;
  determining a channel to which said set-top converter box is tuned by sampling said drive signals;
  generating a coded representation of said determined channel; and
  outputting said coded representation.

17. The method as recited in claim 16, wherein said electronic display comprises at least one display element, and said drive signals comprise scan signals provided over scan lines that enable each display element and segment signals provided over segment lines that drive each segment of said display element, said step of determining a channel to which said set-top converter box is tuned further comprising:
  (a) determining if a scan line for said display element is active;
  (b) if said scan line is active at step (a), then determining which of said segment lines are active to determine character being displayed by said display element; and
  (c) repeating steps (a) and (b) for each display element in said electronic display.

18. The method as recited in claim 16, wherein said step of generating a coded representation of said determined channel comprises generating an ASCII value of said channel to which said set-top converter box is tuned.

19. The method as recited in claim 18, wherein said step of outputting said coded representation comprises serially transmitting said ASCII value to a collection meter.

20. The method as recited in claim 19, further comprising:
  storing, at said collection meter, said ASCII value; and
  forwarding said ASCII value at predetermined times to a central collection site.

* * * * *

UNITED STATES PATENT AND TRADEMARK OFFICE
CERTIFICATE OF CORRECTION

PATENT NO. : 6,567,978 B1
DATED : May 20, 2003
INVENTOR(S) : Lester L. Jarrell

It is certified that error appears in the above-identified patent and that said Letters Patent is hereby corrected as shown below:

<u>Column 4,</u>
Line 19, delete "stores" and insert -- store, -- therefor;

<u>Column 5,</u>
Line 5, delete "character" and insert -- characters -- therefor;
Line 25, delete "references" and insert -- reference -- therefor;

<u>Column 7,</u>
Line 32, delete "connect" and insert -- connected -- therefor;

<u>Column 8,</u>
Line 7, delete "teal" and insert -- real -- therefor;
Line 15, delete "preformed" and insert -- perform -- therefor;
Line 51, delete "1Oa" and insert -- 10a -- therefor.

Signed and Sealed this

Second Day of December, 2003

JAMES E. ROGAN
*Director of the United States Patent and Trademark Office*

(12) EX PARTE REEXAMINATION CERTIFICATE (5406th)
United States Patent
Jarrell

(10) Number: US 6,567,978 C1
(45) Certificate Issued: Jun. 13, 2006

(54) TELEVISION AUDIENCE MONITORING SYSTEM AND METHOD EMPLOYING DISPLAY OF CABLE CONVERTER BOX

(75) Inventor: Lester L. Jarrell, Lakeside, CA (US)

(73) Assignee: ADcom Information Services, Inc., Deerfield Beach, FL (US)

Reexamination Request:
No. 90/006,872, Nov. 12, 2003

Reexamination Certificate for:
Patent No.: 6,567,978
Issued: May 20, 2003
Appl. No.: 09/169,065
Filed: Oct. 9, 1998

Certificate of Correction issued Dec. 2, 2003.

(51) Int. Cl.
*H04N 7/16* (2006.01)
*H04N 5/445* (2006.01)
*H04N 5/50* (2006.01)
*G06G 3/04* (2006.01)
*H04B 1/18* (2006.01)

(52) U.S. Cl. ............................ 725/14; 725/18; 725/19; 348/563; 348/731; 345/34; 455/154.1; 455/154.2

(58) Field of Classification Search .................. 725/9, 725/12, 14–21; 345/618; 455/2.01, 154.1, 455/154.2
See application file for complete search history.

(56) References Cited

U.S. PATENT DOCUMENTS

| | | | | |
|---|---|---|---|---|
| 4,343,042 A | * | 8/1982 | Schrock et al. | 725/116 |
| 4,566,030 A | * | 1/1986 | Nickerson et al. | 379/92.04 |
| 4,885,632 A | * | 12/1989 | Mabey et al. | 725/20 |
| 5,301,028 A | * | 4/1994 | Banker et al. | 348/570 |
| 5,881,360 A | * | 3/1999 | Fong | 725/18 |
| 6,182,807 B1 | * | 2/2001 | Saito et al. | 191/2 |

OTHER PUBLICATIONS

Kaye, Remote Control Devices: A Naturalistic Study, 1994, UMI Dissertation Services, whole document.*
Christiansen and Fink, Electronics Engineers' Handbook, 1989, ISBN 0–0–020982–0, p. 16–52–p. 16–55.*
Bonds and Burns, Principles of Electronic Circuits, 1987, West Publishing Company, ISBN: 0–314–23505–1, p. 328–p. 331.*
Newton, Newton's Telecom Dictionary, 1997, Flatiron Publishing, edition 12, p. 54.*

* cited by examiner

*Primary Examiner*—Christopher Grant

(57) ABSTRACT

A display interface device and method for determining a currently tuned-to channel of a set-top converter box having an electronic display that indicates the currently tuned-to channel via seven-segment display elements in response to drive signals provided thereto by the set-top converter device. The display interface device includes an electrical connection to the electronic display and a controller. The controller receives the drive signals over the electrical connection and generates information representative of the currently tuned-to tuned channel for use by downstream components. The information representative of the tuned channel may be output as an ASCII value representative of the currently tuned-to channel. The display interface may be part of a viewership metering system when used in conjunction with a viewership collection meter to determine viewer habits.

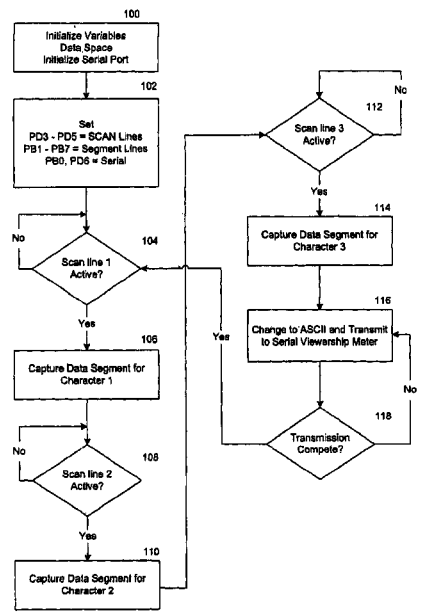

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

* * * * *